United States Patent [19]  [11] 3,898,252
Serota et al.  [45] Aug. 5, 1975

[54] PREPARATION OF ENOL ESTERS

[75] Inventors: Samuel Serota, Philadelphia; Edward S. Rothman, North Hills, both of Pa.

[73] Assignee: The United States of America as represented by the Secretary of Agriculture, Washington, D.C.

[22] Filed: Feb. 26, 1973

[21] Appl. No.: 335,859

[52] U.S. Cl. ............................................. 260/410.9 N
[51] Int. Cl.$^2$ .......................................... C07C 67/04
[58] Field of Search ........................... 260/410.9 N

[56] References Cited
UNITED STATES PATENTS
3,646,077  2/1972  Hübner et al. ............... 260/410.9 N
3,666,781  5/1972  Serota et al. ................. 260/410.9 N OTHER PUBLICATIONS
Rothman et al., J. Am. Oil Chemists' Soc., 48(8), 373–375, August, 1971.

Primary Examiner—Donald G. Daus
Assistant Examiner—D. G. Rivers
Attorney, Agent, or Firm—M. Howard Silverstein; Max D Hensley

[57] ABSTRACT

Enol esters of aliphatic and aromatic monocarboxylic acids containing from 8 to 22 carbon atoms are prepared in quantitative yields by three novel methods. Propyne is reacted with the selected acid in the presence of zinc catalyst and water. The selected acid is reacted with a gas containing 85% of a 50-50 mixture of methyl acetylene and propadiene and 15% propane in the presence of a zinc catalyst. In the third method, a previously prepared sample of the desired enol ester is included in the charge with the selected acid, the propyne and the zinc catalyst. Excellent yields were obtained with all three processes.

7 Claims, No Drawings

PREPARATION OF ENOL ESTERS

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of enol esters. More particularly, it relates to the preparation of enol esters of aliphatic and aromatic monocarboxylic acids containing from 8 to 22 carbon atoms. The monocarboxylic acids may be synthetic or derived from animal or vegetable sources. Still more particularly, it relates to three new procedures for the preparation of the enol esters.

The known procedures for making an enol ester such as isopropenyl stearate are referred to in our copending application, Ser. No. 822,693, filed May 7, 1969, now U.S. Pat. No. 3,666,781. Our copending application also describes a novel preparation of isopropenyl stearate in which water was completely excluded from the process because one would normally expect addition of water to kill the reaction, that is, that the enol ester would be consumed as it was formed by reaction with the water to give acetone and stearic acid.

An object of this invention is to provide simple, direct improved processes for the preparation of enol esters.

According to this invention, enol esters of aliphatic and aromatic monocarboxylic acids containing from 8 to 22 carbon atoms are prepared by three new procedures. In a first process propyne is added to the acid in the presence of zinc catalyst and water. In a second process the acid is heated with a gas containing 85% of a 50-50 mixture of methyl acetylene and propadiene and 15% in the presence of a zinc catalyst. In addition to the acid, the propyne and zinc catalyst, the charge in a third process includes a predetermined amount of a previously prepared sample of the desired enol ester.

As previously stated, one skilled in the art would expect the addition of any water to the acid and propyne in the presence of zinc catalyst to consume the enol ester and kill the reaction. However, surprisingly, this did not happen. In fact, with the small amount of water used in the experiments of this invention the reaction time was halved and the product had a markedly improved color.

Isopropenyl stearate is an excellent example of the usefulness of the enol esters. It is an important reagent for introducing the stearoyl group into a wide variety of product such as medicinals, lubricants and fine chemical preparations (J.A.O.C.S. 45, 189-193, 1968). It has the desirable advantages of high reactivity, favorable, usually quantitative yields, and purity of crude product uncontaminated by masses of by-products like stearic acid, pyridine salts, or methanolic sodium methoxide as in the case when the classical reagents stearic anhydride, stearoyl chloride and methyl stearate are used. Isopropenyl stearate generates gaseous acetone as the sole by-product leaving a relatively uncontaminated, high purity crude product. In addition, since the reaction product acetone is an expelled gas, the reactions typically go to completion. The evolution of gaseous acetone tends to drive the reaction to completion and acylation occurs even in many unfavorable cases.

A careful distinction must be made between isopropenyl stearate and the similar sounding but completely different compound isopropyl stearate. Thus, isopropenyl stearate is effective in introducing the stearoyl group into an amide as for example in the conversion of N-butylstearamide to N-butyl distearamide (J. Org. Chem. 29, 646-650, 1964). In this conversion, isopropyl stearate is totally ineffective. The closely related vinyl homolog, vinyl stearate, is also totally ineffective as a stearoyl group carrier (J. Org. Chem. 29, 646-650, 1964). Therefore, it is necessary to treat isopropyl, isopropenyl and vinyl esters as totally dissimilar compound types even though formally they fit into the classification of homolog types. The anomalous properties of the vinyl esters relative to ordinary esters have been pointed out by Adelman (J. Org. Chem. 14, 1057-1077, 1949) who found the interchange reaction of vinyl esters to be distinctly different in nature from ordinary transesterifications or ester-acid interchanges.

In addition to the behavioral differences between isopropenyl and vinyl esters, the reactions of formation of these esters show very sharp demarcations. For example, vinyl acetate requires mercury catalyst to exchange with stearic acid to form vinyl stearate whereas isopropenyl acetate does not require the mercury catalyst to react.

In view of the foregoing facts, it should be evident to one skilled in the art that the reaction of methyl acetylene (propyne) and stearic acid could not be predicted in advance as to degree or identity of products.

A critical element for the success of the process of this invention is the fact that the zinc stearate catalyst forms a homogeneous liquid melt with stearic acid thus providing a medium which dissolves appreciable amounts of propyne. The propyne can be introduced into the apparatus ab initio in batch operations or fed into excess melted stearic acid-zinc stearate in continuous operations.

The process of this invention is illustrated in the following examples wherein all reactions were done in a 1 liter reaction vessel equipped with means for stirring.

EXAMPLE I

A charge of 80 gm. of stearic acid (97-98% pure) and 20 gm. of zinc stearate in the reaction vessel was placed in a pressure autoclave and converted to a homogeneous melt. After cooling, about 0.9 gm. of water was added, the vessel was well flushed with nitrogen, and then by means of a pressure burette 2 moles of propyne were added as a liquid. The temperature in the autoclave was raised to 150°C. and held at this level for about 2 hours under a pressure of about 350 pounds per square inch after which the autoclave was allowed to cool before opening. Analysis of the white colored product showed that it was 95% isopropenyl stearate and 5% of a mixture of stearic anhydride and unreacted stearic acid. The catalyst was unaffected and in reusable condition. Formation of metallic zinc was not observed under the above conditions.

Although relatively pure stearic acid was used in the above example, commercial "cold-pressed" stearic acid (a mixture of about 40% stearic acid and 60% palmitic acid) and other similar mixtures of fatty acids from saponified vegetable and animal fats and oils are also operable in the process of this invention.

The addition of water not only did not kill the reaction as one would expect, it increased the safety and afforded a more economical isopropenylation by allowing completion of the reaction at a lower propyne pressure and at a lower temperature for a shorter period of time.

Table I shows some of the physical properties of enol esters prepared by the procedures of this invention.

TABLE I

| Enol Ester[a] | m.p. or (b.p.) | Density | $n_D$(°C) |
|---|---|---|---|
| Isopropenyl Behenate | 49.0–49.2C | — | 1.4425 |
| Isopropenyl Stearate | 37–38C (184–9/0.4mm) | — | 1.4416 (40 C) |
| Isopropenyl Oleate | 24 C | 0.8675 (30 C) | 1.4522 (30 C) |
| Isopropenyl Palmitate | 24 C | 0.8585 (30 C) | 1.4435 (30 C) |
| Isopropenyl Myristate | (100/0.7 mm) | 0.8615 (30 C) | 1.4425 (30 C) |
| Isopropenyl Laurate | 6 C (114/1 mm) | 0.8650 (26 C) | 1.4377 (25 C) 1.4365 (30 C) |
| Isopropenyl Pelargonate | 62/0.15 mm | 0.8763 (30 C) | 1.4316 (30 C) |
| Isopropenyl Octanoate | 63/0.4 mm 73/3 mm | 0.8810 (30 C) | 1.4256 (30 C) |
| Isopropenyl "tallowate" | 124/0.075 mm | — | 1.4424 (35 C) |
| Isopropenyl ξ-Phenylstearate | 189/0.15 mm | 0.9122 (30 C) | 1.4865 (30 C) |

[a]All isolated yields exceeded 90 mole percent.

EXAMPLE II

A charge of 75 gm. of stearic acid, 25 gm. of zinc stearate and 140 ml. of a gas containing 85% of a 50-50 mixture of methyl acetylene and propadiene and 15% propane was heated for about 9 hours at about 175°C. to give a quantitative conversion to isopropenyl stearate. In experiments with this process, the zinc catalyst was separated from the product either by distillation, chromatography or extraction and filtering.

Since the propadiene in the above used gas can easily be isomerized to methyl acetylene by passing it through a catalyst treated with a proptonic or Lewis acid type material, the economics of this process can be improved considerably.

EXAMPLE III

A charge of 50 gm. of stearic acid, 55 gm. of isopropenyl stearate, 50 gm. of zinc stearate, and 1 mole of propyne was heated for about 3 hours at 140°–145°C. The pressure during the reaction ranged from 70 to 365 pounds per square inch. Infrared spectra of the product showed quantitative conversion to isopropenyl stearate.

We claim:

1. A process for the preparation of enol esters of aliphatic monocarboxylic acids having from 8 to 22 carbon atoms and of a mixture of positional isomers of phenylstearic acid comprising the step of reacting for about 2 hours a monocarboxylic acid and propyne in the presence of zinc stearate catalyst and water, the acid and catalyst being first heated until they form a homogeneous melt, said reaction proceeding at a temperature of about 150°C and a pressure of about 350 pounds per square inch.

2. The process of claim 1 in which the monocarboxylic acid is stearic acid.

3. The process of claim 1 in which the monocarboxylic acid is behenic acid.

4. The process of claim 1 in which the monocarboxylic acid is octanoic acid.

5. The process of claim 1 in which the acid is a mixture of fatty acids derived from saponified animal oils.

6. The process of claim 1 in which the acid is a mixture of fatty acids derived from saponified vegetable oils.

7. The process of claim 1 in which the monocarboxylic acid is a mixture of positional isomers of phenylstearic acid.

* * * * *